(No Model.)
J. M. NORRIS.
CAR WHEEL.
No. 398,437. Patented Feb. 26, 1889.
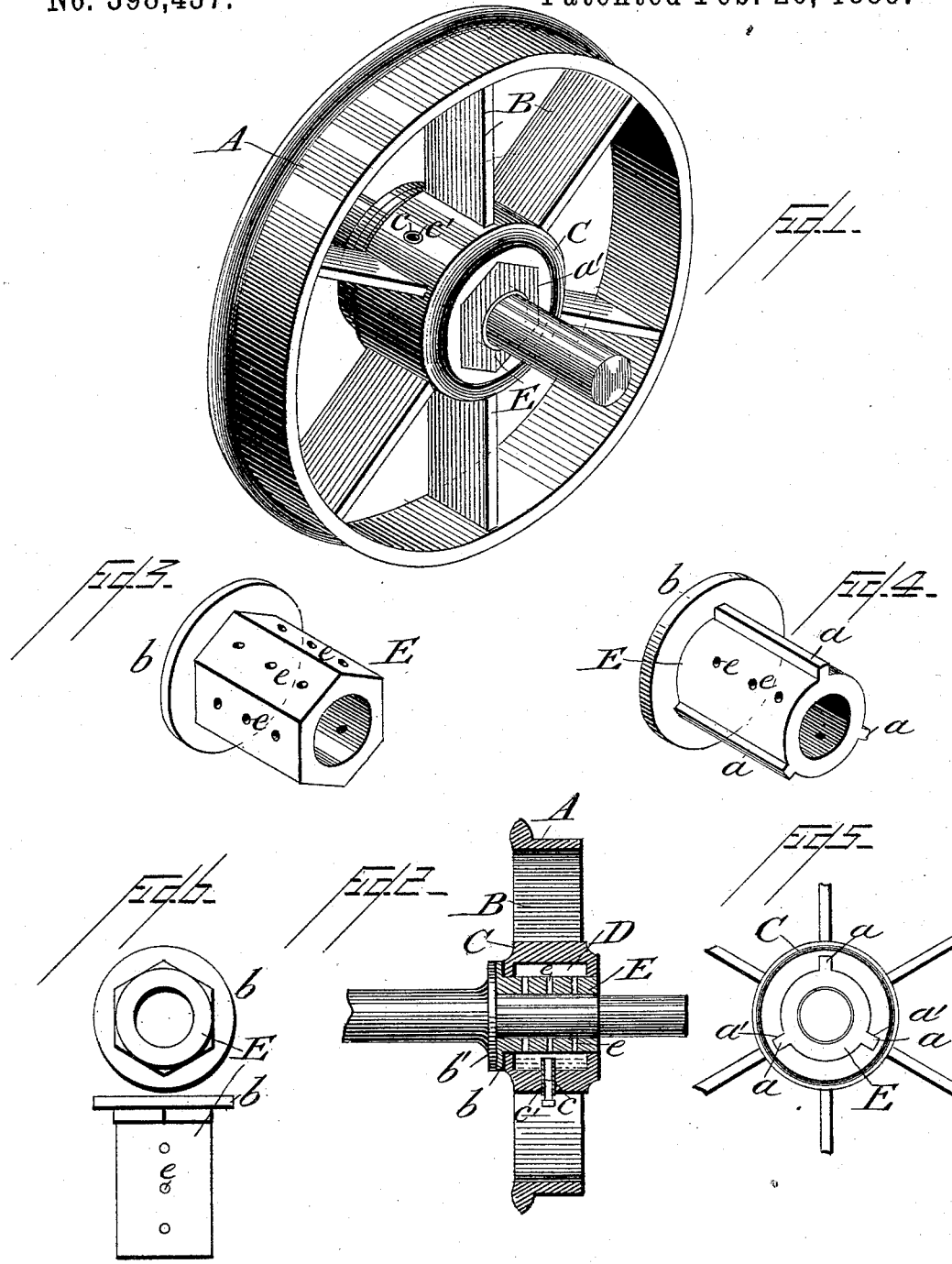
Witnesses
F. H. Schott.
G. W. Burroughs
Inventor.
James M. Norris
By his Attorney
W. P. C. Chandler

UNITED STATES PATENT OFFICE.

JAMES M. NORRIS, OF WILKES-BARRÉ, PENNSYLVANIA.

CAR-WHEEL.

SPECIFICATION forming part of Letters Patent No. 398,437, dated February 26, 1889.

Application filed June 5, 1888. Serial No. 276,110. (No model.)

*To all whom it may concern:*

Be it known that I, JAMES M. NORRIS, a citizen of the United States, residing at Wilkes-Barré, in the county of Luzerne and State of Pennsylvania, have invented certain new and useful Improvements in Car-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of car-wheels in use on mining-cars in which the wheel revolves upon the axle, the object being to provide a removable bushing which takes the wear off the axle, and which bushing, when worn, may be removed from the hub of the wheel and a new one substituted, thus allowing the wheel to be retained in use until its tread and flanges are worn out.

A further object of my invention is to make the wheel self-oiling by providing an oil-chamber surrounding the bushing, which chamber is supplied with oil through a tube extending from the outside of the hub through the chamber to within a short distance of the bushing, thus allowing the chamber to contain a comparatively large quantity of oil without the use of a plug in the outer opening of the hub to prevent its escape as the wheel revolves.

In carrying out this invention I construct the tread and body of the wheel in the usual manner, the tread having its surface chilled and the body connecting the tread with the hub composed of spokes radiating from the hub; or it may be formed as a plate or web, plain or corrugated, connecting the two. In order to form the oil-chamber, a large core is set in the hub, its ends being smaller than the middle portion, so as to form bearings at each side of said hub for the ends of the bushing, while the enlarged middle portion of the core forms the oil-chamber. Through the oil-chamber and supported at each end by the hub is the bushing, preferably made of cast metal and polygonal on its outer surface, or provided with projecting ribs which engage with corresponding recesses in the sides of the hub and effectually prevent rotation of the bushing within the hub. A broad flange at one end of the bushing forms a bearing for the shoulder of the axle and effectually prevents wear of the hub by said axle. Entering the oil-chamber from the outside of the hub is a tube, the inner end of which comes nearly to the outer surface of the bushing, and through this tube the chamber is supplied with oil, its projection into the same preventing the oil from running out when the outer end of the opening through the tube is at the under side of the hub.

To enable the oil to reach the axle from the chamber, a series of small holes may be drilled through the bushing at suitable points, all as will be hereinafter particularly described in connection with the drawings, in which—

Figure 1 is a perspective view of a complete wheel, a part of the hub being removed to show the arrangement of the bushing with relation to the oil-chamber and the tube through which said chamber is supplied with oil. Fig. 2 is a diametrical section through the wheel and bushing, also showing a portion of the axle. Fig. 3 is a perspective view of the bushing, showing its polygonal outer section, by which it is prevented from turning in the hub. Fig. 4 is also a perspective view of a modification of the bushing, in which it is provided with longitudinal ribs projecting radially and entering recesses in the sides of the hub to prevent rotation therein. Fig. 5 is an end view of a hub provided with a bushing like that shown in Fig. 4. Fig. 6 shows another modification of the bushing, the polygonal portion extending only through one end of the hub.

In the figures, A represents the tread of the wheel, and B the spokes, connecting the same with the hub C. The tread and its connections with the hub are of the form and construction in common use for such wheels, and therefore need no special description.

In casting the wheel the hub C is provided with an enlarged chamber, D, serving the purpose of an oil-reservoir, and being of such capacity as to hold a supply of oil that will keep the axle lubricated for a long time. The inner wall of this oil-chamber is formed by a bushing, E, that passes through the chamber and forms the axle-bearing. This bushing is supported at each end by the hub, and is prevented from turning therein by its polygonal form, or by ribs a, extending longitudinally over its outer surface, as shown in Fig. 4 of the drawings. These ribs, or the corresponding corners of the bush when the same is made polygonal, engage with the recesses a', formed in the hub for their reception. One end of the bushing E is provided with a flange, b, extending over that portion of the hub that would otherwise come in contact with the shoulder b' of the axle F. This flange protects the end of the hub from being worn away by the shoulder, as such wear all comes on the flange, which is renewed whenever a new bushing is inserted in the wheel. A hole, c, is bored through the outer shell of the hub into the chamber D, and into this hole is inserted the short tube c', the inner end of which approaches nearly to the outer surface of the bushing E, while its outer end may be flush with the outer surface of the hub. Through this tube the oil for the lubrication is introduced into the chamber D, and finds its way from said chamber to the axle through a series of small holes, e, formed in the bushing for that purpose. The projection of the tube c' into the chamber prevents the escape of oil through the tube, unless the chamber is so full that when the tube is on the under side of the hub the oil stands above its open mouth. A plug may be used, if desired, in the outer end of the tube; but it will be evident that, should this plug drop out and a portion of the oil be lost, enough will remain to keep the axle perfectly lubricated for a considerable time.

Having thus described my invention, I claim as new and desire to secure by Letters Patent the following:

As an improvement in wheels for mine-cars, the combination of a wheel having a chambered hub, with a bushing inserted in said hub and forming the axle-bearing, said bushing being polygonal in cross-section to prevent rotation in the hub, substantially as specified.

In testimony whereof I affix my signature in presence of two witnesses.

JAMES M. NORRIS.

Witnesses:
JOHN M. LAWTON,
G. BURROUGHS.